May 3, 1960     H. D. ALGIE     2,934,975

CONTROL OF DIFFERENTIAL MECHANISMS

Filed June 16, 1958     3 Sheets-Sheet 1

Inventor
H. D. ALGIE
By Fetherstonhaugh & Co.
Attorneys

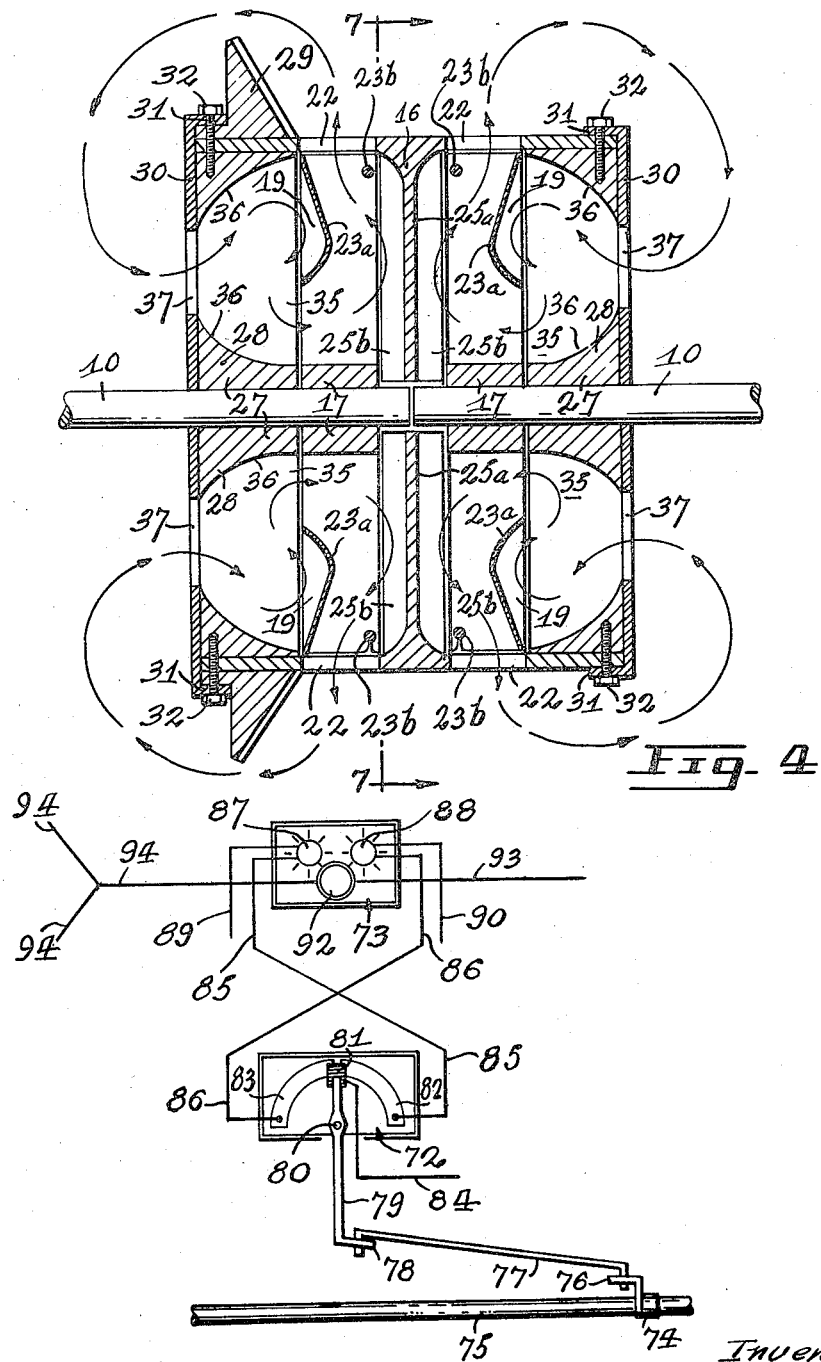

May 3, 1960  H. D. ALGIE  2,934,975
CONTROL OF DIFFERENTIAL MECHANISMS
Filed June 16, 1958  3 Sheets-Sheet 3
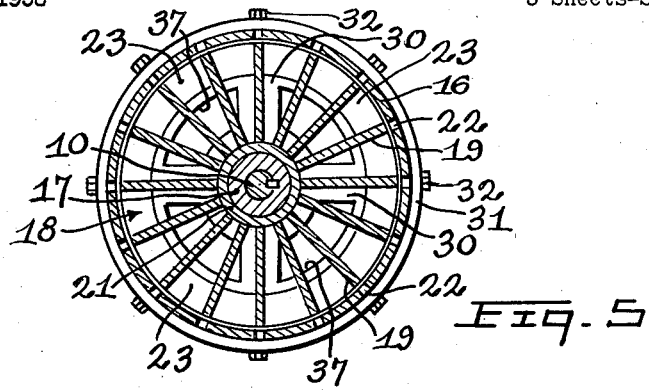
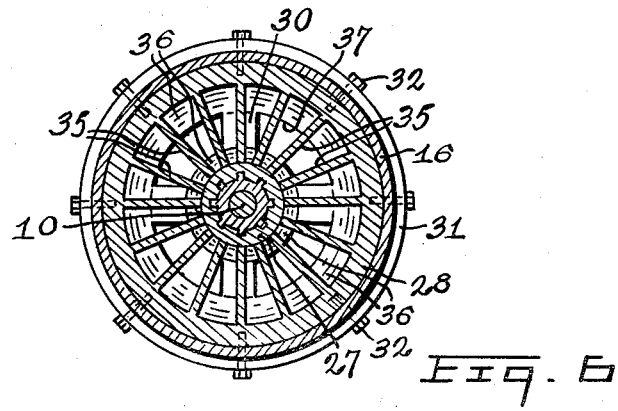
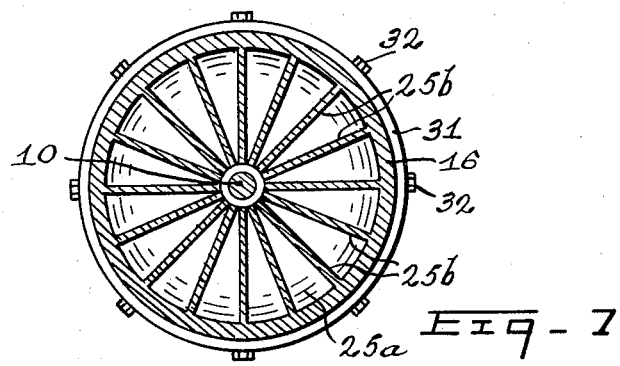
INVENTOR
H.D. ALGIE
BY Fetherstonhaugh & Co.
ATTORNEYS United States Patent Office 2,934,975
Patented May 3, 1960

2,934,975
CONTROL OF DIFFERENTIAL MECHANISMS
Harry D. Algie, Montreal West, Quebec, Canada
Application June 16, 1958, Serial No. 742,253
12 Claims. (Cl. 74—650)

This invention relates to improvements in the differential mechanisms for self-propelled vehicles, such as automobiles, trucks and the like, and particularly to a differential mechanism in which fluid driving compensation is provided either to bring about uniformity of driving force to the both axles or to permit the one or the other of said axles to idle on the short side when making a turn or change in direction.

The invention also embodies certain distinct safety features which tend to improve conditions in the differential when the vehicle is changing its direction. The invention also contemplates the ability of the mechanism to increase mobility of the vehicle when faced with impaired traction such as on snow and ice covered road surfaces.

When a vehicle makes a turn or rounds a curve centrifugal force throws the weight of the vehicle onto the outside wheels and lightens the inside wheels. This shift of the weight varies with the angle of the turn and the speed of the vehicle. It is possible to lift the inside wheels completely off the ground if the angle is sharp and the speed sufficient. Indeed, automobiles have been rolled over when these two conditions were extreme.

My invention couples all the power (and drag) of the engine to the outside driving wheel and frees the inside wheel when cornering. Traction for the powered wheel is increased considerably when weighted and spinning and skidding are reduced to the minimum. Therefore, a vehicle equipped with a compensator according to the present invention, whether under power coasting or braking will corner with increased safety.

There is another factor when cornering and that is the straight line of momentum factor. The contact between the front wheel tires and the road counteracts the straight line of momentum when it is desirable to change the direction of travel. If there is any power applied to the inside driving wheel the counteracting action of the angled front wheels is opposed by the inside pushing rear wheel. The vehicle is thus forced to make a much wider turning arc than anticipated due to the "sidling" action of the angled front tires and often hits the road shoulder or the ditch.

My invention which completely frees the inside driving wheel and couples the full power of the engine to the outside wheel assists the angled front wheels to negotiate the turn. This action can be illustrated by using a four wheeled warehouse platform truck. The front wheels are on free swivels and there is usually a pushing bar at the rear. To make the hand truck turn left the bar is pushed with the right hand on the extreme right side of the bar, to turn it right push with the left hand. It is obvious, therefore, if the front swivel wheels were locked in a left turn position it would require greater strength in a left hand push to move the truck and if the floor was greasy the truck would have a tendency to travel in a straight line, whereas a right hand push would move the truck with less force and twist it in the direction of the angled wheels with a decreased tendency to skid the front wheels sideways.

My invention provides automatically, torque in both driving wheels for every standing start and neither wheel can spin independently of the other for a short distance. This feature provides for a skid free straight ahead take-off under power and is of great value in the snow and ice areas in the winter time.

Modern automobiles with torque converters and automatic transmissions have a creeping nuisance when standing in gear with the engine idling. My invention greatly reduces this nuisance and except in extreme conditions eliminates creeping completely.

Another nuisance found in the present day automobiles with torque converters is the strength or power required to push or tow them when out of commission. My invention makes it much easier to move a vehicle with a dead engine and it can be towed with less power at any required speed for an unlimited distance.

Under certain adverse driving conditions it would be an advantage to the driver or operator of the vehicle to know when the power of the engine was applied to both driving wheels. My invention provides this knowledge to the operator through a visual indicator which is installed on the instrument panel. By watching the indicator and manipulating the steering wheel the operator can maintain power in both wheels while rocking or bucking out of snow drifts or pulling out of mud holes.

When climbing snow covered hills, particularly long winding grades, it would be an advantage to the driver if it was possible to manually apply the engine power to both driving wheels to maintain momentum. My invention provides this advantage through a by-pass push button switch mounted with the indicator on the instrument panel. The push button depresses against a spring to make contact and immediately the finger pressure is removed the button springs up breaking the contact. The by-pass push button should be placed where the operator has to reach to depress it, in fact the more uncomfortable and awkward the operator becomes holding the button down the possibility of indiscriminate use other than emergency could be substantially lessened. This feature can be used as a safety precaution when descending slippery hills as well as climbing the same.

Proceeding now to a more detailed description in which reference will be had to the accompanying drawings, Figure 1 is a sectional view taken through a differential housing embodying this invention as indicated substantially along the line 1—1 of Fig. 2.

Fig. 3 is a diagrammatic view illustrating the control mechanism used to actuate the differential mechanism shown in Figs. 1 and 2.

Fig. 4 is a sectional view illustrating a modified form of barrel and rotor construction.

Fig. 5 is a sectional view taken along the line 5—5 of Fig. 2.

Fig. 6 is a sectional view taken along the line 6—6 of Fig. 2.

Fig. 7 is a sectional view taken along the line 7—7 of Fig. 4.

Figure 2:
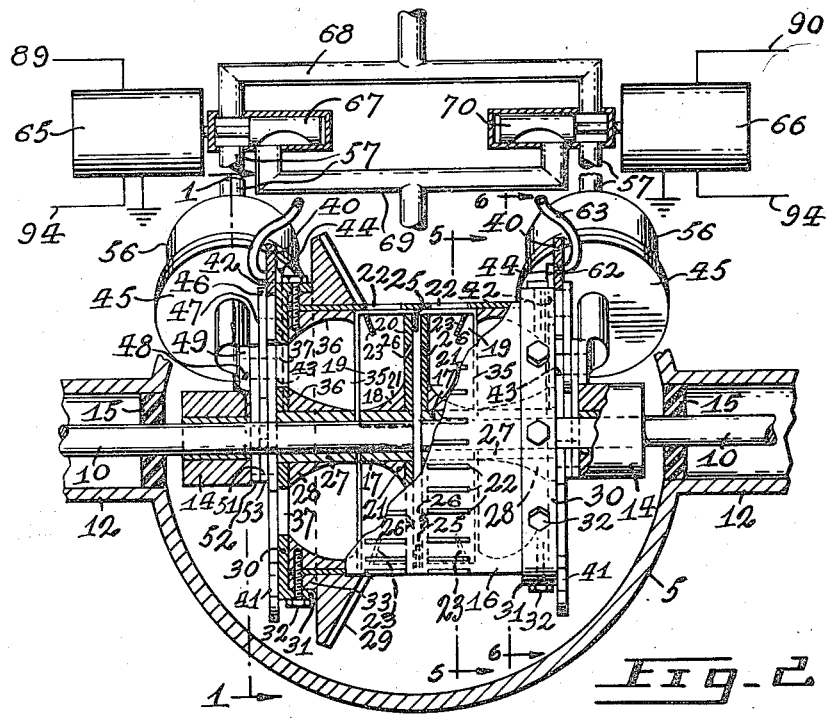
Fig. 2 is another sectional view of the differential housing substantially at right angles to the view shown in Fig. 1, but with certain parts broken away for the sake of clarity.
Figure 1:
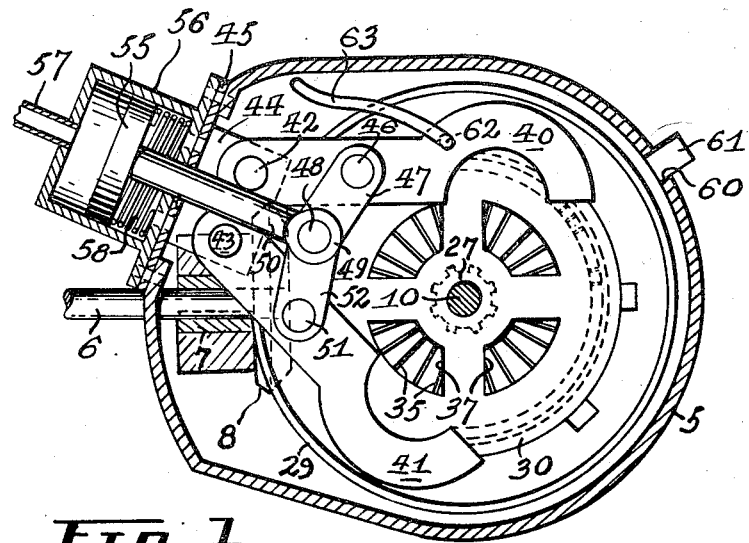

Referring more particularly to Figs. 1 and 2 of the drawings, 5 generally indicates a differential housing and 6 indicates a drive shaft having one end mounted in a bearing 7 within the housing and having a bevel gear 8 secured to the end thereof. Left and right wheel axles 10 extend through tubular axle housings 12 into the differential housing 5 from opposite sides thereof and are supported within the housing 5 by bearings 14. An oil seal 15 surrounds the axles 10 at the entrance to the differential housing 5. The axles 10 extend beyond the bearings 14 into opposite ends of a barrel 16 so that the inner end of each axle 10 remote from the wheel (not shown) is disposed in opposing spaced apart relation in the central area of the barrel. The inner end of each axle 10 has a collar 17 fitted thereabout to rotate with the axle. An inner rotor 18 provided with a plurality of radially spaced blades 19 is fitted to collar 17 to rotate therewith. A back plate 20 fitted to the inner end of the rotor 18 closes the inner end of said rotor. The bottom of the inner rotor 18 adjacent the collar 17 is curved upwardly between blades 19 toward the back plate 20 as indicated at 21. The front end of the inner rotor and the top between the blades is open so that oil can enter between the blades from the front and be thrown outwardly through registering slots 22 in the barrel by centrifugal force. A brace 23 is located between each blade 19 adjacent the forward and upper ends thereof. Each brace 23 is in the form of a plate and is downwardly and rearwardly inclined to form a baffle around which the oil must flow before being discharged through the slots 22, thus ensuring that the oil exerts sufficient driving force on the blades 19 before being discharged.

The centre of the barrel is reinforced by an inwardly projecting flange 25 which projects from the inner surface of the barrel between the back plates 20 of the two opposing inner rotors 18. As the oil pressure will be considerable there will be an end thrust applied to the inner rotors and this is taken up by the flange 25. Inclined ports 26 in the back plates 20 permit oil to enter between the back plates to lubricate the flange 25 and thus reduce friction.

A sleeve 27 is disposed about each axle 10 in front of collar 17 to rotate freely about the axle. Sleeve 27 is splined to an outer rotor 28 which is disposed about the sleeve to rotate therewith. Each outer rotor 28 is close fitted in the adjacent end of barrel 16. The left hand end of the barrel 16 has a bevel gear 29 disposed thereabout to mesh with the drive shaft bevel gear 8. A front end plate 30 provided with a flange 31 is fitted on each end of the barrel 16. The right hand front end plate 30 has its flange 31 fitted directly over a marginal portion of the adjacent end of the barrel and is secured by bolts 32 which extend inwardly through the flange 31, barrel 16 and into a solid marginal portion of the outer rotor 28. The left hand front end plate 30 has its flange 31 overlying a shoulder 33 provided at the rear of bevel gear 29. Bolts 32 extend inwardly through flange 31, shoulder 33, barrel 16 and into the solid marginal portion of the left hand outer rotor 28.

It will be appreciated that the barrel 16 and both outer rotors 28 are directly connected to each other and to the bevel gear 29 so that the driving force from the drive shaft 6 causes their positive rotation through the medium of driving gear 8. These component parts, however, rotate freely about the wheel axles 10. The manner in which the outer rotor 28, front end plate 30 and barrel 16 are secured holds the rotor 28 in slightly spaced relation to the inner rotor 18 which is fitted to rotate with axle 10 and relative to the outer rotor 28 and barrel 16. The outer rotor 28 is provided with radially arranged blades 35 which extend between the solid outer and inner marginal portions. The inner surfaces of the outer and inner marginal portions are curved, as indicated at 36, to give a maximum rearward thrust of oil between the blades 35 rearwardly through an open rear end which communicates directly with the opposing open front end of the inner rotor 18. Passages 37 in the front end plates 30 admit oil to the blade portion of the outer rotor 28.

The passages 37 are opened and closed by pairs of gates 40 and 41 which are pivotally connected at their outer ends by pins 42 and 43 to a bracket 44 extending inwardly from a housing closure plate 45. Gate 40 is connected intermediate its length by a pivot pin 46 to one end of a link 47. The other end of link 47 is connected by a pivot pin 48 to an extension bracket 49 at the lower end of a piston shaft 50. Gate 41 is connected intermediate its length by a pivot pin 51 to one end of a second link 52. The other end of link 52 is also connected to pivot pin 48 in lapping relation to link 47. A spacer 53 is interposed about pin 51 between gate 41 and link 52 so that the gates 40 and 41 are in the same vertical plane while the links are arranged scissor fashion about the common pivot pin 48.

A piston head 55 operates in a cylinder 56 to move shaft 50. The cylinder is provided with a pressure fluid line 57 which supplies fluid under pressure to one side of the piston head 55 to force it downwardly against the bias of a compression spring 58 on the opposite side of said piston head. This pressure causes the piston 50 to pivot the gates 40 and 41 outwardly about their axes 42 and 43, respectively, through the media of links 47 and 52, thus opening the passages 37 to admit fluid between the blades 35 of the outer rotors 28. As long as the drive shaft 6 is under power, the barrel 16 and outer rotors 28 will be positively driven through gears 8 and 29 relative to the axles 10 and the inner rotors 18. When the gates 40 and 41 are open fluid flows through the passages 37 and between the rotating blades 35 of the outer rotors 28. The fluid is compressed in vortex against the inner rotor blades 19 causing the rotors 18 to be rotated and thus driving the axles 10. The fluid is then discharged by centrifugal force from the inner rotors 18 through the slots 22 in the barrel 16 which are aligned with the blades 19 of the inner rotors. As will be seen, the inner lining of the outer and inner rotors is curved, as indicated at 36 and 21 respectively, to cause the fluid to flow about a maximum surface of the blades of each rotor. The braces or baffles 23 are arranged between the blades 19 to ensure that the fluid from the outer rotor 36 is directed downwardly towards the hub of the inner rotor 18 before passing through the slots 22 in the barrel 16.

As will be seen in Fig. 1, the housing 5 is provided with a fluid intake port 60 which is closed by a plug 61. This port 60 is suitably located to bring the level of the fluid just below the uppermost portion of the barrel so that the slots 22 at the upper side of the barrel project above the fluid level.

When either the right or left hand gates 41 and 42 are closed the fluid is cut off from the corresponding passages into the outer rotor. The upper gate 40 has a small passageway 62 therethrough which is connected on the outer side to one end of a tube 63 having its other end located in the upper portion of the housing 5 well above the fluid level. The rotary action of the outer rotor 36 pumps air from the upper region of the housing through the tube 63 driving the fluid from the barrel and thus reducing the driving force on the inner rotor 18 which, in turn, reduces the drive on the corresponding axle 10.

The barrel slots 22 are fractionally wider than the thickness of the inner rotor blades 19 and have four important functions. Firstly, they establish the fluid and air exit from the barrel, creating a continuous circulation, housing to barrel, barrel to housing. Secondly, they act as booster vanes assisting the inner rotor 18 to pick up the torque of the barrel. The thickness of the wall of the barrel or the depth of the slots also influences the rapidity with which the barrel and the inner rotor are brought into uniform speed. The greater the depth of the slots, the sooner the uniform speed is accomplished. Thirdly, the slots may act as vanes to retard rotation of the inner rotors when the drive force to the drive shaft is broken, for example, when coasting. And fourthly, when the vehicle comes to a stop and the inner rotors cease to rotate the slots serve as fluid ports permitting the fluid to quickly fill the barrel by gravitation. This provides for the torque in both axles for every standing start.

The left and right hand pistons 55 are actuated through solenoids 65 and 66, respectively. When it is desired to open the left hand gates 40 and 41, solenoid 65 is energized to move valve 67 to a position where the fluid line 57 is in direct communication with a supply line 68 which is connected at its outer end to the pressure side of a force pump (not shown) which is operated by the vehicle engine. The solenoid 65 is de-energized to cause valve 67 to be retracted to a position where line 57 is in communication with a bypass line 69 which is connected to the suction side of said force pump. This withdraws the fluid from the left cylinder 56 permitting the piston head 55 to be biased outwardly by spring 58 and retracting the piston shaft 50 to close the gates 40 and 41 at the left hand side of the barrel 16.

The right hand solenoid 66 operates its valve 70 in a similar manner to that above described to control the opening and closing of the gates 40 and 41 on the right end of barrel 16.

As will be seen in Fig. 3, the solenoids 65 and 66 are controlled by a switch mechanism 72 and/or the instrument panel 73, the latter being located in a suitable position on the dash board of a vehicle. A clamp 74 is secured to the front wheel tie rod 75 and is provided with a bracket 76, to which one end of a link 77 is connected. The other end of link 77 is connected at 78 to the lower end of a switch actuating arm 79 which is rotatable intermediate its length about a pivotal axis 80 mounted on said switch mechanism 72. The free end of arm 79 is provided with a bridging plate 81 which normally bridges the gap between the curved contact plates 82 and 83 when the vehicle is travelling in a straight line. The bridging plate 81 is connected by a lead wire 84 to a battery (not shown). This lead wire is intercepted by the vehicle ignition switch (not shown) so that when the engine is shut off the switch mechanism 72 is de-energized. Lead wires 85 and 86 from curved contact plates 82 and 83, respectively, are connected to signal lights 87 and 88. The lights 87 and 88 are connected by lead wires 89 and 90, respectively, to solenoids 65 and 66 shown in Fig. 2.

In operation, when changing direction the vehicle tie rod 75 normally moves left or right to angle the front wheels to the desired course. For a left turn the tie rod 75 moves right and clamp 74 pulls the link 77 in that direction to rotate the switch actuating arm counterclockwise, thus breaking the contact with contact plate 82. This turns off the light 87 which, in turn, breaks contact with solenoid 65 causing the solenoid valve 67 to shut off the fluid pressure line 68 and bypassing the fluid from the left cylinder 56 to the suction line 69. This results in the closure of the left side gates 40 and 41 which allows the speed of the left rear wheel on the short side of the turn to be reduced. While this action is taking place the right wheel solenoid is energized and the full driving force is applied thereto.

When making a right turn the reverse procedure takes place. The tie rod moves to the left breaking contact with curved contact plate 83 while maintaining contact with plate 82. This results in de-energizing of the right wheel solenoid 66 which closes the right hand gates 40 and 41 and simultaneously introducing air into the right side of the barrel 16 to pump the oil out of that side of the barrel through the slots 22. This permits reduction of the driving force on the right wheel axle 10 until the turn is completed.

The panel 73 also carries an emergency switch 92 which may be directly connected on one side to the battery by lead line 93 and on the other side to lead wire 94 which bypasses the switch mechanism 72. Leads 94 are divided so as to be connected to both solenoids 65 and 66 when switch 92 is energized. This emergency switch 92 may be employed in the event that one wheel is spinning on a slippery surface and contact of the switch mechanism 72 has been broken with respect to the solenoid which actuates the other wheel. The closing of switch 92 not only puts the non-spinning wheel into power drive but also tends to reduce the speed of the spinning wheel to a point where the speed of both wheels is equalized.

The gates 40 and 41 should preferably be of a lightweight metal and comparatively thin but inflexible keeping in mind the constant support they bear from the barrel end plate 30, the bracket 44, and the stresses which they will be required to withstand. This type of fluid passage closure does not need to be leak-proof but should close off a sufficient amount of fluid to free the inner rotor from pressure emanating from the outer rotor as well as the barrel slots. The suction from the outer rotor will materially assist the sealing of the gates when in their closed positions. The gate closure is also assisted by the centrifugal forces when turning. For example, during a left turn the left hand gates 40 and 41 will be closed and the ensuing centrifugal force will tend to hold them firmly over the fluid openings 37 so that the air through tube 63 replaces the fluid rapidly. Furthermore, this same centrifugal force will reduce the fluid level in the adjacent end of the housing and raise the level at the opposite end where it supplies an extra amount of fluid for the pumping right wheel rotors. When the vehicle is tilted at its maximum angle common to normal usage the fluid should be sufficient to cover at least half of the oil intake passages 37 at the highest end of the tilted barrel.

When the compensator is employed on small lightweight vehicles the hydraulic strength of the gate actuating pistons is not required and the solenoids 65 and 66 may be directly connected by suitable actuating rods to the left and right hand gate actuating links 47 and 52.

Fig. 4 illustrates a modified barrel and rotor construction in which the inner rotors consist of radial blades extending from the collar 17 which is secured to rotate with axle 10. The inner rotor blades are supported adjacent their outer sides by elongated curved baffles 23a which extend between adjacent blades from their outer ends and curve inwardly and downwardly for substantially one-half the length of the blades to increase the tortuous path of the fluid pumped from the outer rotor blades 35. The rear of the inner rotor is not provided with a back plate but instead is supported adjacent the outer ends by spacer rods 23b. The left and right sides of the barrel are divided by a partitioning flange 25a which extends from the inner surface of the barrel to substantially adjacent the sides of the inner ends of axles 10. Blades 25b are rigidly secured to opposite sides of centre flange 25a so that fluid entering between the blades 25b from the inner rotor blades is pumped back into the path of the blades 19 before being discharged through the slots 22 in the barrel wall. As the centre flange blades 25b rotate with the barrel they tend to augment the driving force applied to the inner rotor blades 19 from the fluid pumped from the outer rotor blades 35 and thus increase the capacity of the inner rotors to attain a uniform speed with the outer rotor blades and the barrel.

What I claim is:

1. A differential mechanism comprising a differential gear housing partially filled with a fluid, a barrel mounted within said housing, a pair of axially aligned axles having opposed end portions disposed concentrically within said barrel, a drive shaft extending into said housing and operatively connected to said barrel for position rotation of said barrel about said axles and relative thereto, a first fluid coupling means between said barrel and one of said axles, a second fluid coupling means between said barrel and the other of said axles, and means for transferring the fluid between said barrel and said housing and for separately controlling the speed of rotation of each of said axles by separately regulating the transfer flow through said first and second coupling means.

2. A differential mechanism as set forth in claim 1, in which the operative connection between said drive shaft and said barrel comprises a gear mounted on said drive shaft within said housing to rotate with said shaft and a second gear operable by said first gear and secured to said barrel with its axis coinciding with the axis of said barrel.

3. A differential mechanism as set forth in claim 1, in which said fluid coupling means includes a first outer rotor provided with radially extending blades and secured to the inner surface of said barrel at one end to freely rotate about one of said axles, a first inner rotor adjacent said first outer rotor inwardly thereof and provided with radially extending blades, said first inner rotor being secured to said last mentioned axle to rotate therewith relative to said barrel, a second outer rotor provided with radially extending blades and secured to the inner surface of said barrel at the other end thereof to freely rotate about the other of said axles, a second inner rotor adjacent said second outer rotor inwardly thereof and provided with radially extending blades, said second inner rotor being secured to said other of said axles to rotate therewith relative to said barrel, and means for separately regulating the flow of fluid between the first inner and outer rotors and the second inner and outer rotors, respectively.

4. A differential mechanism as set forth in claim 3, in which said last mentioned means includes at least one passageway at the outer end of each outer rotor through which fluid is admitted and a plurality of slots provided in the surface of said barrel opposite the outer ends of the inner rotor blades through which fluid is ejected and closure means adjacent each of said passageways to the outer rotors, said closure means being operable to cut off the flow of fluid through said passageways.

5. A differential mechanism as set forth in claim 4, in which each of said closure means comprises a pair of gates separately pivoted at one end about separate axes parallel to the axis of said barrel and lying in a common plane, said gates being swingable toward and away from one another to selectively close and open said passageway to the outer rotor, and a piston linked at one end to each of said pair of gates intermediate their length and operable to effect said closing and opening operation of the gates.

6. A differential mechanism as set forth in claim 4, in which said inner rotors are provided with supporting members between the blades thereof, said supporting members being located remotely from the axis thereof and extending from the upper margins of the blades adjacent the outer rotor downwardly and inwardly to provide a baffle about which fluid from said outer rotor flows before being discharged through said slots in the barrel.

7. A differential mechanism as set forth in claim 6, in which the lower marginal portions of said baffles are curved outwardly and downwardly toward said outer rotor to increase the flow of fluid on the surfaces of the inner rotor blades.

8. A differential mechanism as set forth in claim 6, including an inner rotor back facing plate extending from the axis to the outer margins of the blades to direct fluid in the inner rotor towards the slots in said barrel.

9. A differential mechanism as set forth in claim 6, including a partition between the adjacent ends of the first and second inner rotors, said partition extending from the inner surface of the barrel toward the axis thereof and being provided with radial vanes on opposite sides thereof, each set of vanes being opposed to the end edges of the adjacent inner rotor blades and being rotatable with said barrel relative to the inner rotor blades whereby fluid from the inner rotor blades is thrown back by the partition vanes into said rotor blades.

10. A differential mechanism as set forth in claim 5, in which said piston is operable by a remote control apparatus including a solenoid, an electrical device connected with the front steering mechanism for selectively actuating the solenoid for each pair of gates in response to turning movement of the steering mechanism to open and close said pairs of gates.

11. A differential mechanism as set forth in claim 10, including an electrical contact mechanism adapted to bypass said selective electrical device to activate both solenoids for simultaneous opening of both pairs of gates.

12. A differential mechanism as set forth in claim 3, including an air duct communicating with said barrel and the upper portion of said housing to selectively permit replacement and displacement of air in the barrel during changes of fluid level in the barrel.

References Cited in the file of this patent
UNITED STATES PATENTS

| | | |
|---|---|---|
| 2,229,228 | Sutter | Jan. 21, 1941 |
| 2,549,557 | Yancho et al. | Apr. 17, 1951 |
| 2,827,802 | Burke | Mar. 25, 1958 |